UNITED STATES PATENT OFFICE.

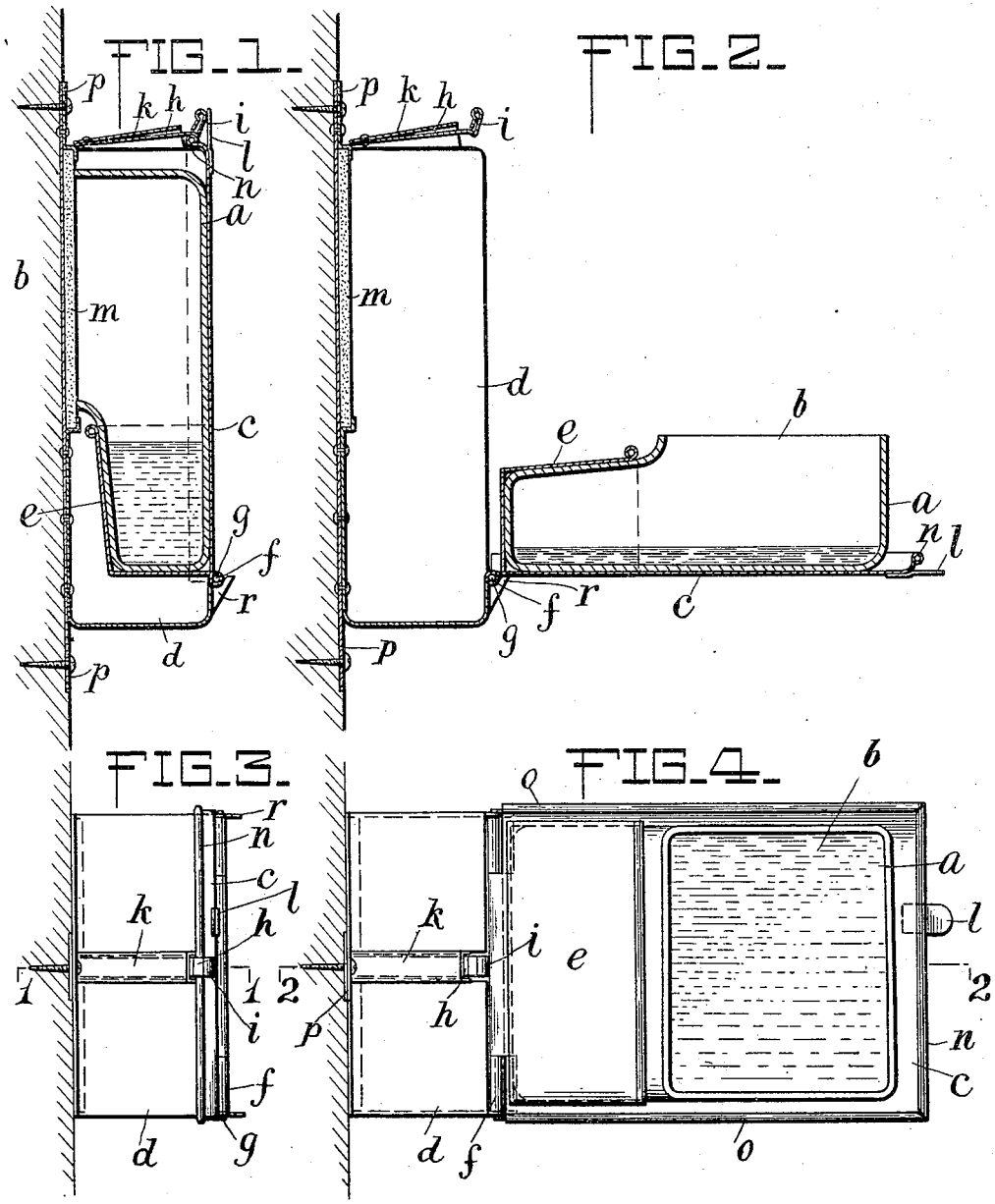

GOTTHILF ZWEIGLE, OF ESSLINGEN, GERMANY.

SPITTOON.

No. 841,301. Specification of Letters Patent. Patented Jan. 15, 1907.

Application filed August 16, 1906. Serial No. 330,836.

*To all whom it may concern:*

Be it known that I, GOTTHILF ZWEIGLE, a subject of the German Emperor, residing at Esslingen, in the Kingdom of Würtemberg, Empire of Germany, have invented new and useful Improvements in Spittoons, of which the following is a specification.

This invention relates to a spittoon with a receptacle for liquid that can be turned up or down. This spittoon differs from those of the same kind already known in the receptacle for the liquid being inserted in a pocket-shaped extension secured to the closing-cover of a vertically-arranged spittoon-casing and being brought into the interior of the casing by the raising of the cover and its opening being closed by means of a packing device arranged on the vertical back part of the casing. By this arrangement the receptacle for the liquid can be tightly closed when in the vertical position and the spilling of liquid prevented. This spittoon is therefore specially suitable for use in places in which it is exposed to frequent shocks and vibrations, as in ships, railway-carriages, &c.

In order that my invention may be fully understood, I will proceed to describe it with reference to the accompanying drawings, in which—

Figure 1 is a vertical central section showing my improved spittoon as closed, taken on the line 1 1 of Fig. 3. Fig. 2 is a similar view thereof, showing the spittoon as opened, taken on the line 2 2 of Fig. 4. Fig. 3 is a top plan view of the spittoon as closed. Fig. 4 is a top plan view of the spittoon as opened.

The spittoon consists, substantially, of the vertically-arranged box-shaped spittoon-casing $d$ and the receptacle $a$ for the saliva. This receptacle consists of a long glass dish $a$ of shoe shape, partly closed at the top and having at the top a suitable opening $b$. The closed portion of the dish is inserted in a pocket-shaped extension $e$, fixed to the closing-cover $c$ of the spittoon-casing $d$. This folding cover $c$, which is provided with a handle $l$, is formed at one end in the manner of a hinge and seated with a pin $g$ in hinges $f$, which are formed by pieces of sheet metal suitably fixed in the casing. The locking is insured by means of a spring $h$, fixed to the casing and concealed by a sleeve K. At one end of this spring is a hook-shaped locking-piece $i$, which when the closing is effected takes hold above the flanged edge $n$ of the cover. The two side edges $o$ of the cover are likewise flanged and take hold over the corresponding edges of the casing. On the inside of the back of the casing a suitable layer $m$ of felt or the like is inserted for the purpose of tightly and completely closing the opening $b$ in the glass dish.

$r$ represents brackets on the lower end of the casing for supporting the cover with the receptacle when opened. The casing itself is further provided with one or more extension-pieces $p$ for fixing it to walls or the like.

What I claim, and desire to secure by Letters Patent, is—

1. A spittoon comprising a vertically-arranged casing, a cover provided with a pocket-shaped extension and hinged to the lower end of the casing and a shoe-shaped receptacle having a top opening and inserted into the pocket-shaped extension.

2. A spittoon comprising a vertically-arranged casing having a packing layer secured to the back thereof, a cover provided with a pocket-shaped extension and hinged to the lower end of the casing and a shoe-shaped receptacle having a top opening, completely closed by the packing layer, and inserted into the pocket-shaped receptacle.

In testimony whereof I have set hereunto my hand in the presence of two witnesses.

GOTTHILF ZWEIGLE.

Witnesses:
   ANGUS A. GROSS,
   ERNST ENTINGENMANN.